Aug. 28, 1945.   R. A. A. COUZINET   2,383,845
DEVICE FOR OPERATION OF THE CONTROLS OF AIRPLANES
Filed April 25, 1941   2 Sheets-Sheet 2

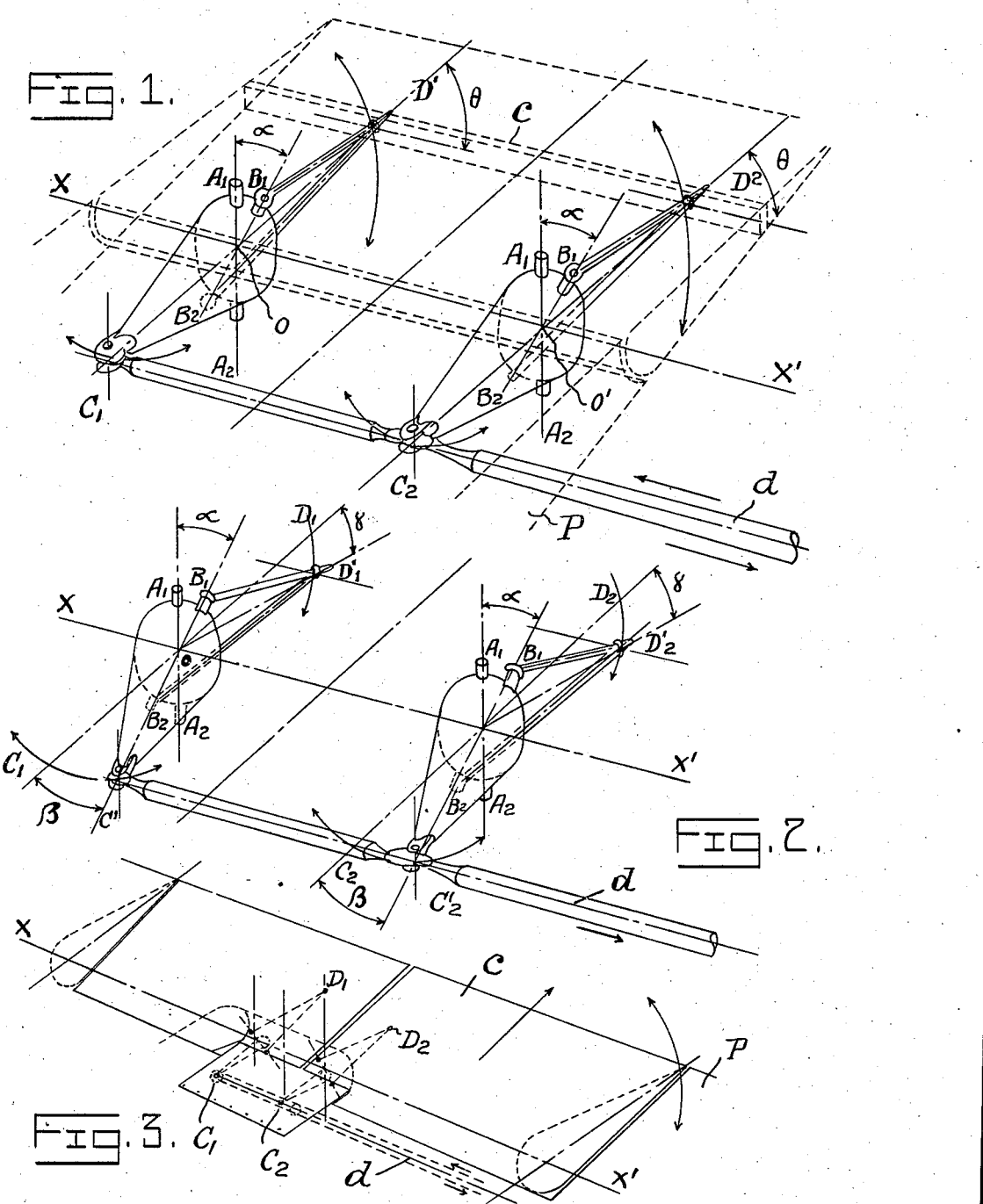

INVENTOR
René Alexandre Arthur Couzinet.
BY
ATTORNEY

Patented Aug. 28, 1945

2,383,845

UNITED STATES PATENT OFFICE 2,383,845

DEVICE FOR OPERATION OF THE CONTROLS OF AIRPLANES

René Alexandre Arthur Couzinet, Rio de Janeiro, Brazil

Application April 25, 1941, Serial No. 390,326
In France April 25, 1940

6 Claims. (Cl. 244—90)

The present invention relates to the operation of controls of all kinds (ailerons, stabilizers, rudders) in airplanes and other aircraft.

The ever increasing speeds required for modern airplanes demand the elimination of all unnecessary external resistances with a view to obtaining a coefficient of drag as feeble as possible.

One of these external resistances results from the operating means of the controls where all the elements of these controls are not placed inside the profiles. With the thin profile as employed nowadays, the realization of the operating members of the controls entirely placed inside the profile presents a problem which does not seem to have been solved until now in view of the present disposition consisting of one or more external guides fitted to the control unit placed in the fixed plane on which the control member is articulated. The connection between the guides and the mechanism is effected by connecting rods which are wholly or in part constantly exposed to the relative wind of the airplane, as is the case with the guides.

A satisfactory solution of the problem above referred to should fulfill at least the following conditions:

The movement must be positive, i. e., the controls must not be subject to displacements which are not immediately transmitted to the elements of the actuating means.

The operating means must be taut and must not contain organs susceptible of slackening or stretching.

If these two conditions are not complied with, the controls are subject to vibration. One is, therefore, induced to eliminate, in the realization of the operation of the controls, all cables and gears in order to preserve only rigid members.

The solution given to such a problem by the invention as disclosed herein, utilizes an articulated connection of rigid members.

The characteristic element of this connection is a universal joint so modified that the arms of its crosshead are disposed at an angle that is not of 90 degreees, one of the arms of the said crosshead being trunnioned within the fixed plane, and the other being connected to the control member which pivots, when the crosshead moves at various angles, around a theoretical axis passing through the center line of the pivot of the control member.

Other characteristic advantages of the connection, defined herein in principle, will be given in the description hereunder relative to a form of realization of actuation and mounting of a lowering aileron according to the invention.

Fig. 1 is a schematic perspective view of an aileron and of its actuating means, the aileron being in its neutral position.

Fig. 2 is a view similar to Fig. 1, the aileron being lowered to a certain angle.

Fig. 3 is a perspective view from below representing the aileron hinged on a fixed plane and showing how the elements of the actuating unit are entirely retracted within the outlines of the profile.

In this embodiment of the invention applied to an aileron $c$ (Figs. 1 and 5), the movement is transmitted from the pilot's cockpit by means of a bar $d$ placed inside the wing or the fixed plane P.

Figure 4:
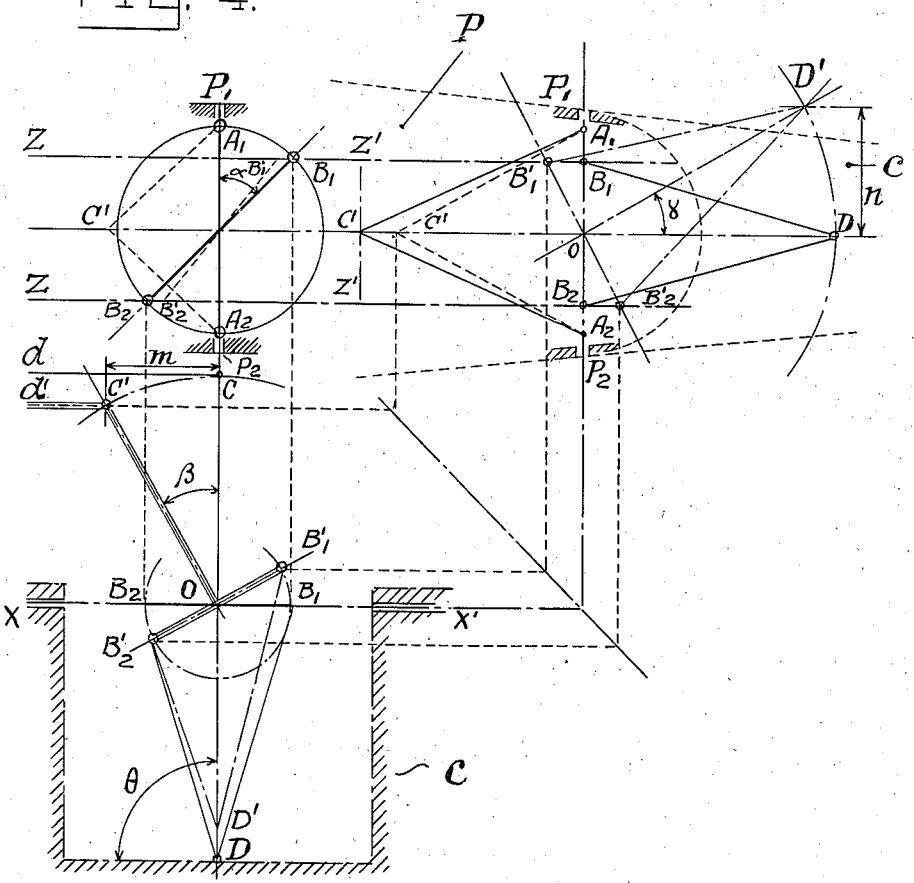
Fig. 4 is a kinematic design of the actuating means.
Figure 5:
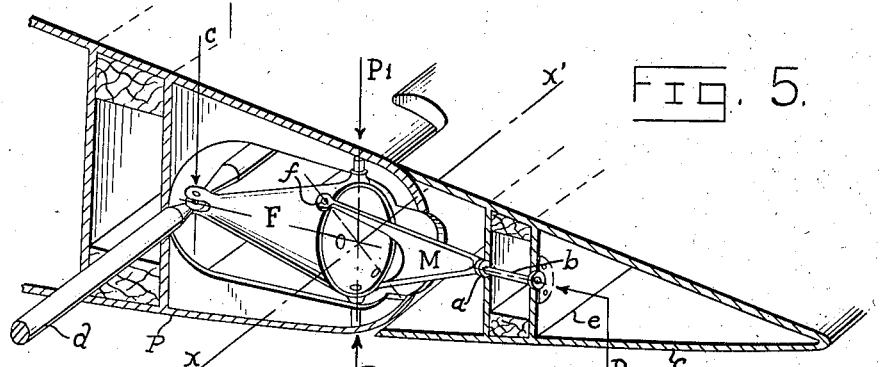
Fig. 5 is a perspective view partly in cross-section showing the actuating means applied to a pivoted aileron which is shown in its neutral position.

Referring to Fig. 5 the aileron $c$ is so mounted on the fixed plane P that it may turn about an axis $x$, $x'$, being carried in suitable pivots not shown, but which may be of any well known form. The conical member F is mounted within the plane P and has trunnions $P'$, $P^2$ whose axis intersects the axis $x$, $x'$ at O, and the actuating bar or rod $d$ is pivoted to the member F at the point C so that longitudinal movement of the rod $d$ turns the member F about its trunnions. A member M is connected by a universal joint $a$ to a bolt $b$ carried by an internal structural rib $e$ in the aileron $c$ while two fork arms on the member M are pivoted at $f$ to the member F in such manner that the axis of these pivots passes through the said point O and is disposed at an angle of about 45° to the axis $P'$, $P^2$, and movement of the member F about the axis $P'$, $P^2$ causes the member M to turn about its pivots $f$ and thus causes the aileron $c$ to turn about the axis $x$, $x'$, in relation to the plane P. The aileron $c$ must pivot around the theoretical axis XX' passing through the center of a crosshead $A_1A_2$—$B_1B_2$. Referring to Fig. 4, it will be seen that the arm $A_1A_2$ of the crosshead is trunnioned at $P_1P_2$ in the fixed plane P. This arm is turned by operation of the connecting rods $d$ pivotally connected at C with the crosshead. This connection is represented by bars $CA_1$ and $CA_2$.

At the point $B_1$ and $B_2$ of the second arm of the crosshead there is a trunnioned piece corresponding to the member M (Fig. 5) and represented by the rigid bars $DB_1$ and $DB_2$, at the common extremity D of which the trunnion of a theoretical axis OD is mounted in a fork fixed to the aileron as at A Fig. 5.

The operation is as follows:

When the connecting rod $d$ is displaced through the distance $m$, the unit $A_1$—$CA_2$ corresponding to the member F (Fig. 5) pivots round the axis $A_1$—$A_2$ at an angle $\beta$. Points $B_1$ and $B_2$ describe arcs of a circle on the planes of lines ZZ' and reach respectively $B_1'$ and $B_2'$.

Unit $B_1DB_2$ being indeformable, point D reaches D', the said unit $B_1DB_2$ having turned a limited angle around the axis OD, and the aileron connected to this unit having pivoted at an angle $\gamma$ round the axis XX' which passes through point O.

The relative values of the movements $m$ and $n$ or of the corresponding angles $\beta$ and $\gamma$ depend upon the angle $\alpha$ formed by the arms of the crosshead $A_1A_2$—$B_1B_2$.

In the particular case where $\alpha = 45$ degrees, and if $$\beta = \gamma$$
$$OC = OD$$

then $$m = n$$

The invention comprises in its scope all means suitable for permitting the pilot to vary the angle $\gamma$ in flight.

In the embodiment of Figs. 1 and 2 the connecting crosshead is obtained by extending beyond the surface of a cone the trunnions $A_1A_2$ and $B_1B_2$, this cone constituting at the same time the rigid connection shown at F, Fig. 5, and indicated at Fig. 4 by the lines $CA_1$ and $CA_2$. The cone has at its apex a cotterpin through which the cone is jointed to the operating rod $d$. The levers $DB_1$ and $DB_2$ of a design according to Fig. 4 are constituted by a rigid V the two arms of which are trunnioned at $B_1$ and $B_2$ and the apex of which is extended by a trunnion of the theoretical axis OD adjusted at a fixed distance from the aileron or other controlling device. The various joints, or at least some of them, can be fitted with ball bearings.

As regards trunnion D, of the axis OD, which is only displaced at limited angles round the said axis, it is only necessary to mount this trunnion in elastically deformable sockets (of rubber, for instance).

If only one connection $CA_1$, $A_2$—$DB_1B_2$ is provided for the aileron or other control, such control must be pivoted to the fixed plane. For such purpose it may be fitted with trunnions disposed according to the theoretical axis XX'. However, the invention may obviate the necessity for such pivots. It is enough to provide a pair of actuating devices as shown in Figs. 1, 2 and 3. The connections are set apart at the distance O—O' and the arms of equal levers $C_1O$ and $C_2O'$ are coupled to the bar $d$ so that $OO' = C_1C_2$.

Likewise:

$$OD_1 = O'D_2$$
$$OO' = D_1D_2$$

If angle $\theta$ (Fig. 1) equals 90 degrees, when axes $OC_1$ and $O'C_2$ are displaced at an angle $\beta$ (Fig. 2) the axes $OD_1$ and $O'D_2$ are displaced at an angle $\gamma$ round the axis XX'. This arrangement facilitates the mounting of the control, the remounting being possible without necessitating any adjustment. For dismounting, the aileron or the control $c$ and the plane P being respectively cut in dovetail, as shown in Fig. 3, it is sufficient to remove from the outside a pin or bolt or any other connecting device provided for at $D_1$ and $D_2$ for taking out the aileron in the direction of the arrow.

It should be noted that if the aileron $c$ or other control is actually fitted with a pivot pin at the axis X—X' on the fixed plane P, the forks such as $B_1D$ and $B_2D$ (Figs. 3 and 4) are not necessarily rigid, the points $B_1B_2D$ having relatively invariable positions.

I claim:

1. A device for controlling an aircraft including a fixed air foil surface and a trailing movable control surface pivotally connected thereto, comprising a control element, a first member, means pivotally mounting the first member on said fixed air foil surface for swinging about a first axis at substantially right angles to the cord of said air foil surface, a second member having two ends, means rotatably connecting one of said ends to said first member about a second axis disposed at an acute angle to the first axis, means for swinging said first member about said first axis, and means mounting the other end of said second member on said control surface for rotation about a third axis substantially transverse to the second axis whereby, when the first member swings about said first axis, to swing said control surface about a fourth axis transverse to the first axis.

2. The combination claimed in claim 1, the said first member, the means pivotally mounting the same, and the means for swinging the same being within the profile of said fixed part of the aircraft.

3. The combination claimed in claim 1, said first and fourth axes extending through and at right angles to one another.

4. The combination claimed in claim 1, said second member comprising a pair of rigid arms, the second axis being at substantially 45 degrees to the first.

5. The combination claimed in claim 1, said first member being of substantially conical contour, the means pivotally mounting the first member for swinging about a first axis comprising trunnions substantially at the base of said cone with a common fixed axis intersecting the center line of the cone, said trunnions being mounted in said relatively fixed part of said aircraft, the second member being substantially triangular with the base of the triangle constituting said one end, said second axis intersecting the first.

6. The combination claimed in claim 1, said first member being of substantially conical contour, the means mounting said first member for swinging about the first axis comprising trunnions substantially at the base of said cone with a common fixed axis intersecting the center line of the cone, said second member being substantially triangular with the base end of the triangle constituting said one end, the means rotatably connecting said one end to the conical member about a second axis at an acute angle to the said first axis comprising trunnions also substantially at the base of the cone with a common fixed axis intersecting the first axis and the center line of the cone.

RENÉ ALEXANDRE ARTHUR COUZINET.